(12) United States Patent
Miyagi et al.

(10) Patent No.: US 8,379,385 B2
(45) Date of Patent: Feb. 19, 2013

(54) ELECTRONIC APPARATUS

(75) Inventors: Junji Miyagi, Daito (JP); Takayuki Yamamoto, Daito (JP); Mari Muroi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 2 days.

(21) Appl. No.: 13/205,909

(22) Filed: Aug. 9, 2011

(65) Prior Publication Data

US 2012/0039031 A1    Feb. 16, 2012

(30) Foreign Application Priority Data

Aug. 10, 2010 (JP) ................................ 2010-179687

(51) Int. Cl.
*H05K 5/00* (2006.01)
*H05K 7/00* (2006.01)
*G11B 3/70* (2006.01)

(52) U.S. Cl. ......... 361/679.58; 361/679.55; 361/679.56; 361/679.57; 361/679.59; 361/679.26; 361/679.27; 361/679.28; 369/282

(58) Field of Classification Search ............. 361/679.01, 361/679.02, 679.08, 679.09, 679.3, 679.55–679.59; 369/282, 291, 253, 44.16, 75.5; 455/325, 455/556.1, 550.1, 90.1, 575.1
See application file for complete search history.

(56) References Cited

U.S. PATENT DOCUMENTS 6,535,378 B1 *   3/2003  Oguchi et al. ........... 361/679.55
2007/0047192 A1 *  3/2007  Kobayashi et al. ........... 361/683

FOREIGN PATENT DOCUMENTS

JP       8-273646       10/1996
JP       2008-257944    10/2008

* cited by examiner

*Primary Examiner* — Jayprakash N Gandhi
*Assistant Examiner* — Jerry Wu
(74) *Attorney, Agent, or Firm* — Morgan, Lewis & Bockius LLP

(57) ABSTRACT

An optical disc reproduction apparatus as electronic apparatus comprises a lock lever for keeping a battery pack attached to a case. The lock lever comprises a lever body and a tongue portion extending from the lever body in a length direction of the lever body. A tongue portion of the lock lever is inserted into the case through an operation opening of the case. The tongue portion is allowed to temporarily escape to a tongue portion escape section of the case, and the entire lever body is housed in the case through the operation opening, so as to assemble the lock lever to the case. This prevents ends of the lever body from being exposed to the operation opening in any position of the lock lever assembled to the case, making it possible to easily assemble the lock lever, and preventing the assembled lock lever from easily falling off.

11 Claims, 12 Drawing Sheets

ELECTRONIC APPARATUS

BACKGROUND OF THE INVENTION

1. Field of the Invention

The present invention relates to an electronic apparatus to and from which a detachable member such as a battery pack is attached and detached.

2. Description of the Related Art

Conventionally, there is an electronic apparatus which allows a battery pack to be attached to and detached from a case for housing electronic components, and uses a lock lever to keep the battery pack attached to the case. In some of such electronic apparatus, a lock lever is provided so as to be reciprocally movable on the inner surface of the case (movable in a first direction and in a second direction opposite to the first direction), while a portion of the lock lever (operation button portion for operating the lock lever) is designed to be exposed to or face an operation opening formed in the case. Such an electronic apparatus is required to be structured so as to prevent the lock lever from falling off through the operation opening. Thus, in some of such electronic apparatus, the lock lever is prevented from falling off by using a fall-off prevention member separate from the lock lever, or by providing an elastic hook integrally with the lock lever or with a member supporting the lock lever.

However, the conventional electronic apparatus have the below-described problems. The arrangement of using a fall-off prevention member separate from a lock lever causes an increase in the number of man-hours to assemble the lock lever to the case, and the assembly of the lock lever to the case becomes complicated. In addition, this arrangement causes an increase in the number of components and in the cost. Further, the arrangement of providing an elastic hook integrally with a lock lever or with a member supporting the lock lever causes the lock lever to easily fall off when a force is applied thereto, so that the fall-off of the lock lever is not sufficiently prevented.

Various methods of locking a battery pack in electronic apparatus are known. For example, Japanese Laid-open Patent Publication 2008-257944 discloses an electronic apparatus in which a pivotally operable lock lever is pivoted to linearly move a lock plate, which is supported to be linearly movable, so as to lock a battery pack. Further, Japanese Laid-open Patent Publication Hei 8-273646 discloses an electronic apparatus in which a slidably supported operating member is slided to swing a swingably supported engaging member so as to lock a battery pack. However, these methods disclosed in the prior art do not solve the above problems.

SUMMARY OF THE INVENTION

An object of the present invention is to provide an electronic apparatus in which a lock lever can be easily assembled, and the assembled lock lever can be prevented from easily falling off.

According to the present invention, this object is achieved by an electronic apparatus comprising: a case; a detachable member to be attached to and detached from the case; and a lock lever provided to keep the detachable member attached to the case, and provided in the case so as to be movable in a first direction and a second direction opposite to the first direction. The case comprises: an operation opening to enable the lock lever to be operated from outside the case; a lever support body to movably support the lock lever; a first restricting member for restricting movement of the lock lever in the first direction; and a second restricting member for restricting movement of the lock lever in the second direction. The lock lever is supported by the lever support body so as to be movable in the first and second directions in a range restricted by the first and second restricting members while a part of the lock lever is exposed to the operation opening. The lever support body comprises an opposite support body part provided in a position opposite to the operation opening. The lock lever comprises a lever body and a tongue portion extending from the lever body in a length direction of the lever body. The lock lever is supported so as to be movable between the operation opening and the opposite support body part such that the length direction of the lever body coincides with the first and second directions, and that the direction perpendicular to both the length and width directions of the lever body coincides with the direction perpendicular to an opening surface of the operation opening. The lock lever is restricted from moving in the second direction by contact of an end of the tongue portion with the second restricting member. The lever body has a width smaller than that of the operation opening. Assuming that L1 is length of the lever body, L2 is length from the end of the tongue portion to an end of the lever body, R1 is length of the operation opening, R2 is length from the second restricting member to the operation opening, and D is movable distance of the lock lever, the length L1 of the lever body satisfies the relation: L1>R1+R2−L2 while the length L2 from the end of the tongue portion to the end of the lever body satisfies the relation: L2<R2−D. The case comprises a tongue portion escape section for temporarily escaping the tongue portion when attaching the lock lever to the case. The tongue portion escape section is connected to the operation opening through a gap between the second restricting member and the opposite support body part. Further, the tongue portion is elastic in the direction perpendicular to both the length and width directions of the lever body.

Preferably, an elastic member is interposed between the lock lever and the case, and the lock lever is biased by the elastic member so as to be held in a position where the detachable member is kept attached to the case.

Preferably, the lock lever comprises a projecting portion to engage with a recessed portion formed in the lever support body, and is held in a position where the detachable member is kept attached to the case when the projecting portion engages with the recessed portion.

Preferably, the lock lever further comprises an operation button portion, and is supported so as to allow the operation button portion to be exposed to the operation opening, and the opposite support body part is provided such that at least a part of the opposite support body part overlaps the operation button portion when the lock lever is in a position where the movement of the lock lever in the second direction is restricted by the second restricting member.

Further preferably, the case houses an optical disc reading unit for reading recorded data from an optical disc, and the detachable member is either a battery pack for supplying electric power to the electronic apparatus or a disc cover for opening and closing a disc mounting unit to mount an optical disc.

According to the electronic apparatus of the present invention, the lock lever can be easily assembled to the case by inserting the tongue portion of the lock lever into the case through the operation opening of the case, and by allowing the tongue portion to temporarily escape to the tongue portion escape section of the case, and further by housing the entire lever body in the case through the operation opening. In addition, even if the lock lever assembled to the case is in any position in the range in which the lock lever can move (more specifically in the range restricted by the first restricting member and the second restricting member), neither the end of the lever body on the side of the first restricting member nor the end of the lever body on the side of the second restricting member is exposed to the operation opening, so that the lock lever does not easily fall off out of the case.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 1A is a schematic perspective view of an optical disc reproduction apparatus according to an embodiment of the present invention in which a disc cover is closed, while

FIG. 2A is a schematic perspective view of the optical disc reproduction apparatus as seen from the bottom, while

FIG. 3B is a schematic perspective view of the lock lever as viewed at a different angle from FIG. 3A, while

FIG. 5A is a partially exploded cross-sectional view along line A-A of FIG. 4, showing how the lock lever is assembled to the optical disc reproduction apparatus, while

FIG. 6A is a schematic cross-sectional view showing a state where the lock lever has been assembled to the optical disc reproduction apparatus, and corresponding to the A-A cross-sectional view of FIG. 4 when the movement of the lock lever in a first direction is restricted, while

FIG. 7A is a schematic cross-sectional view showing a state where the lock lever has been assembled to the optical disc reproduction apparatus, and corresponding to the A-A cross-sectional view of FIG. 4 when the movement of the lock lever in a second direction is restricted, while

FIG. 9B is a schematic perspective view of the lock lever as viewed at a different angle from FIG. 9A, while

FIG. 11A is a partially exploded cross-sectional view along line E-E of FIG. 10, showing how the lock lever is assembled to the optical disc reproduction apparatus, while

FIG. 12A is a schematic cross-sectional view showing a state where the lock lever has been assembled to the optical disc reproduction apparatus, and corresponding to the E-E cross-sectional view of FIG. 10 when the movement of the lock lever in a first direction is restricted, while

FIG. 13A is a schematic cross-sectional view showing a state where the lock lever has been assembled to the optical disc reproduction apparatus, and corresponding to the E-E cross-sectional view of FIG. 10 when the movement of the lock lever in a second direction is restricted, while

DESCRIPTION OF THE PREFERRED EMBODIMENTS

Figure 1A:
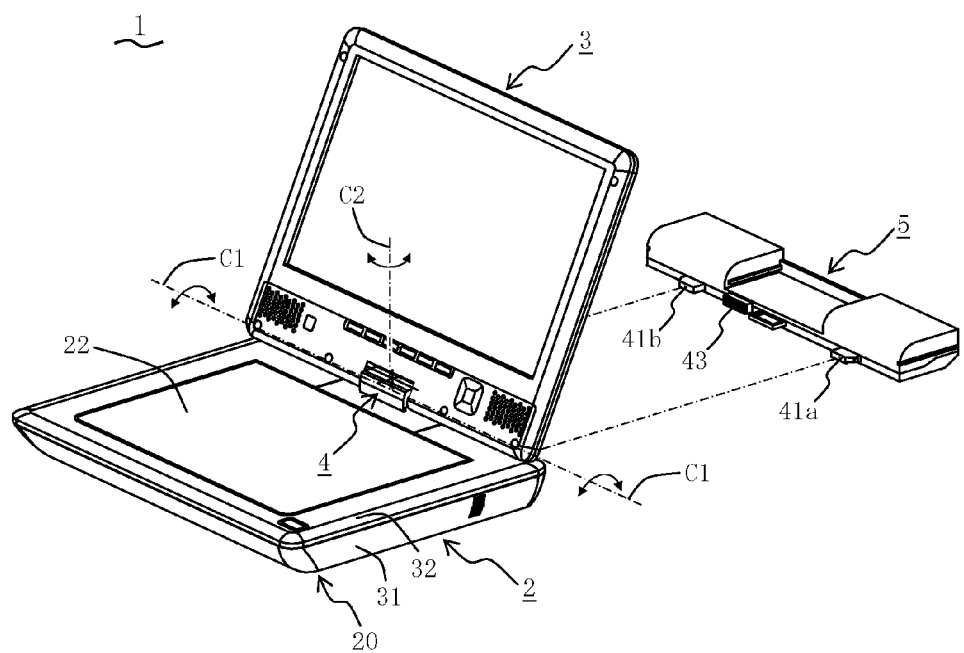

Embodiments of the present invention, as best mode for carrying out the invention, will be described hereinafter with reference to the drawings. The present invention relates to an electronic apparatus. It is to be understood that the embodiments herein are not intended as limiting, or encompassing the entire scope of, the invention. It is also to be noted that like parts are designated by like reference numerals or characters throughout the drawings.

Figure 1B:
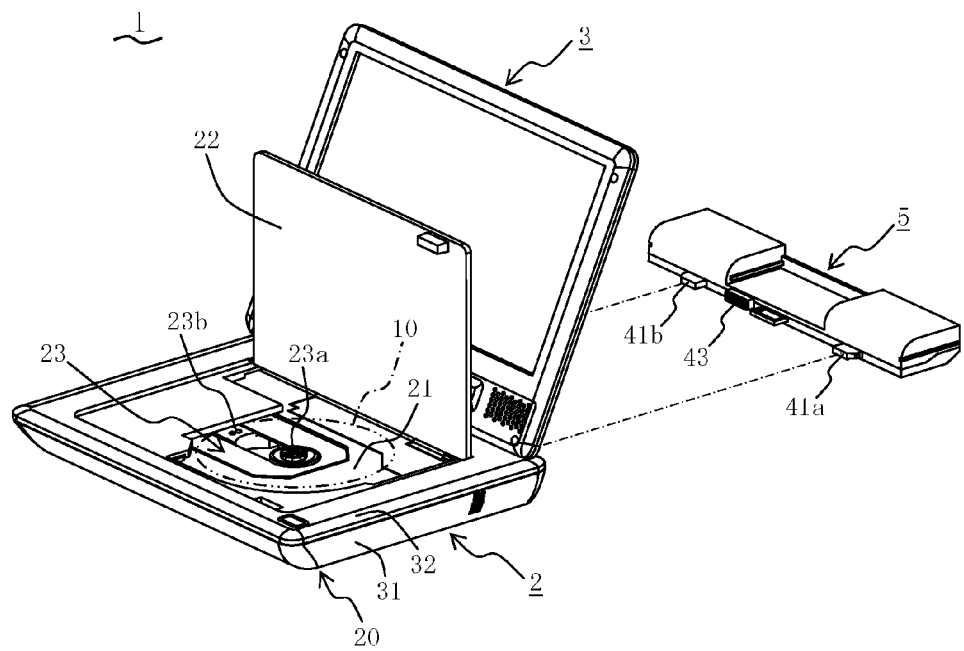
FIG. 1B is a schematic perspective view of the optical disc reproduction apparatus in which the disc cover is opened.
Figure 2A:
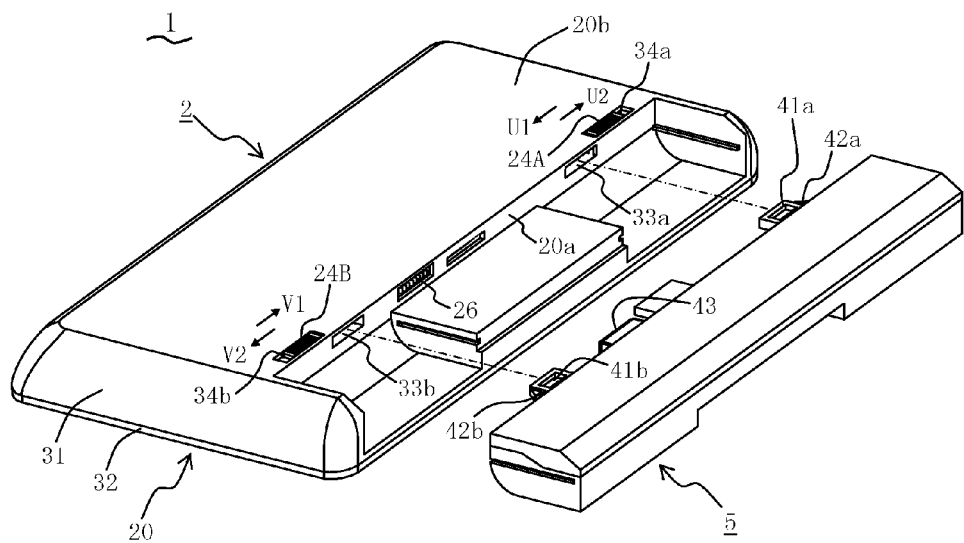
Figure 2B:
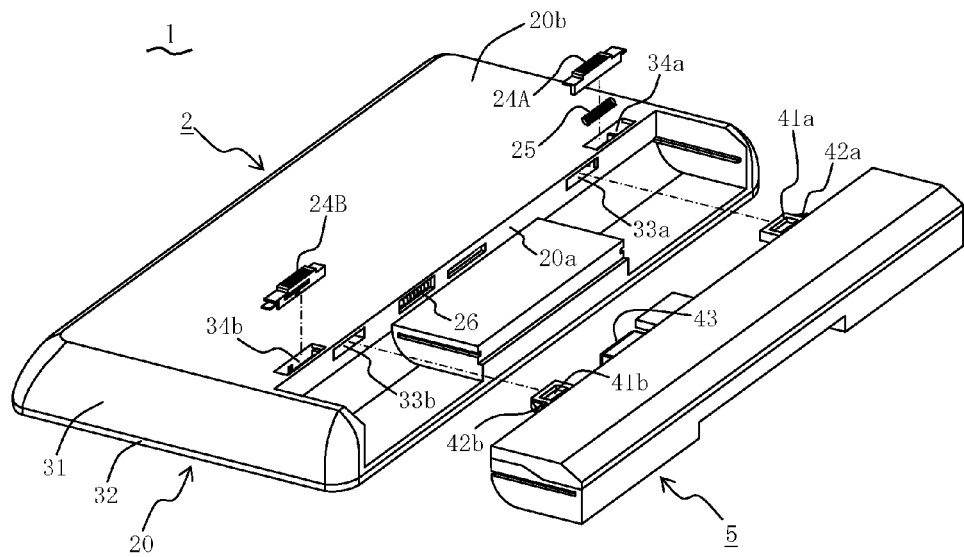
FIG. 2B is a schematic, partially exploded, perspective view of the optical disc reproduction apparatus in which lock levers have been removed from a main body case.

An optical disc reproduction apparatus 1 as an electronic apparatus according to an embodiment of the present invention will be described with reference to FIG. 1A to FIG. 14D. FIG. 1A is a schematic perspective view of the optical disc reproduction apparatus 1 in which a disc cover 22 is closed, and FIG. 1B is a schematic perspective view of the optical disc reproduction apparatus 1 in which the disc cover 22 is opened. FIG. 2A is a schematic perspective view of the optical disc reproduction apparatus 1 as seen from the bottom, and FIG. 2B is a schematic, partially exploded, perspective view of the optical disc reproduction apparatus 1 in which lock levers 24A, 24B have been removed from a main body case 20.

The optical disc reproduction apparatus 1 serves to reproduce images from an optical disc 10 such as DVD (Digital Versatile Disc) or BD (Blu-ray Disc). The optical disc reproduction apparatus 1 is a portable type. Referring to FIGS. 1A, 1B, 2A and 2B, the optical disc reproduction apparatus 1 of the present embodiment comprises a main body unit 2, a display unit 3, and a hinge unit 4 via which the display unit 3 is mounted on the main body unit 2. The display unit 3 is pivotal relative to the main body unit 2 (In FIGS. 2A, 2B, the showing of the display unit 3 is omitted). The optical disc reproduction apparatus 1 further comprises a battery pack 5 as a detachable member to be attached to and detached from the main body unit 2 (main body case 20). The battery pack 5 serves to supply electric power to the optical disc reproduction apparatus 1. The main body unit 2 comprises: a case (hereafter referred to as main body case) 20; a disc cover 22 for opening and closing a disc mounting unit 21 to mount an optical disc 10; an optical disc reading unit 23 for reading recorded data from the optical disc 10; electronic components (not shown) including those forming a drive circuit for driving the optical disc reading unit 23 and a control circuit for controlling the operation of the optical disc reproduction apparatus 1; and so on. The main body unit 2 further comprises lock levers 24A, 24B provided to keep the battery pack 5 attached to the main body case 20 (refer to FIGS. 2A and 2B).

The main body case 20 houses the optical disc reading unit 23 and the electronic components (not shown). The main body case 20 comprises a lower case 31 corresponding to (or more specifically, occupying) a lower part of the main body case 20, and an upper case 32 corresponding to (or more specifically, occupying) an upper part of the main body case 20, in which the lower case 31 and the upper case 32 are connected to each other. Further, the main body case 20 has formed therein: hook insertion openings 33a, 33b for inserting attachment hooks 41a, 41b of the battery pack 5; and operation openings 34a, 34b to enable the lock levers 24A, 24B to be operated from outside the main body case 20. The hook insertion openings 33a, 33b are formed in a rear wall 20a of the main body case 20, while the operation openings 34a, 34b are formed in a bottom wall 20b of the main body case 20.

The disc cover 22 is openably and closably attached to the main body case 20. When the disc cover 22 is opened, the disc mounting unit 21 is opened to allow the optical disc 10 to be mounted or removed, while when the disc cover 22 is closed, the disc mounting unit 21 is closed. A part of the optical disc reading unit 23 including a spindle motor 23a and an optical head 23b is housed in the main body case 20 so as to face the disc mounting unit 21. The optical disc 10 is mounted on the spindle motor 23a and also mounted on the disc mounting unit 21. The optical disc reading unit 23 allows the optical head 23b to emit light to the optical disc 10 and receives reflected light from the optical disc 10, while allowing the spindle motor 23 to rotate the optical disc 10, so as to read recorded data from the optical disc 10.

The lock lever 24A is provided in the main body case 20 so as to be reciprocally movable in a first direction (direction of arrow U1 in FIG. 2A) and a second direction (direction of arrow U2 in FIG. 2A) opposite to the first direction, while a part of the lock lever 24A faces the operation opening 34a of the main body case 20. Further, the lock lever 24B is provided in the main body case 20 so as to be reciprocally movable in a first direction (direction of arrow V1 in FIG. 2A) and a second direction (direction of arrow V2 in FIG. 2A) opposite to the first direction, while a part of the lock lever 24B faces the operation opening 34b of the main body case 20. A spring 25 as an elastic member is interposed between the lock lever 24A and the main body case 20 (without a spring 25 interposed between the lock lever 24B and the main body case 20). The lock levers 24A, 24B will be described in detail later.

The display unit 3 serves to display images, and more specifically displays images based on recorded data read from the optical disc 10 by the optical disc reading unit 23 of the main body unit 2 as well as various images such as a menu screen. The hinge unit 4 is a so-called two-axis swivel hinge, which connects the display unit 3 to the main body unit 2 so as to allow the display unit 3 to be pivotal relative to the main body unit 2 about two mutually perpendicular axes. More specifically, the display unit 3 is pivotal relative to the main body unit 2 about a first center pivot axis C1 (refer to FIG. 1A), passing through a lower end portion of the display unit 3 and parallel to a lower end edge of the display unit 3. Further, the display unit 3 is also pivotal relative to the main body unit 2 about a second center pivot axis C2 (refer to FIG. 1A), passing through a center part of a rear end of the main body unit 2 and vertical to an upper surface of the main body unit 2.

When using the optical disc reproduction apparatus 1, it is brought to a state where, for example, the display unit 3 is opened to stand (more specifically the display unit 3 stands relative to the main body unit 2), or the display unit 3 is laid on the main body unit 2 and opened (more specifically the display unit 3 is laid on the main body unit 2 such that a rear surface, or surface opposite to an image display surface, of the display unit 3 closely faces the upper surface of the main body unit 2). When carrying the optical disc reproduction apparatus 1 as a portable apparatus, the display unit 3 is, for example, closed (more specifically the display unit 3 is laid on the main body unit 2 such that a front surface, or image display surface, of the display unit 3 closely faces the upper surface of the main body unit 2). The optical disc reproduction apparatus 1 is designed to be connectable to an external device (not shown) for use (so that, for example, images based on recorded data on an optical disc which is read from the optical disc by the optical disc reproduction apparatus 1 can be displayed on a display of the external device). When connecting the optical disc reproduction apparatus 1 to an external device for use, it is brought, for example, to a state where the display unit 3 is closed.

The battery pack 5 contains multiple secondary batteries (not shown). The battery pack 5 comprises attachment hooks 41a, 41b for attaching the battery pack 5 to the optical disc reproduction apparatus 1. The attachment hook 41a has formed therein an engaging recess (or slot) 42a to engage with the lock lever 24A, while the attachment hook 41b has formed therein an engaging recess 42b to engage with the lock lever 24B. The battery pack 5 is attached to and detached from the main body case 20. More specifically, the battery pack 5 is attached to the main body case 20 by inserting the attachment hooks 41a, 41b into the hook insertion openings 33a, 33b, respectively, and detached from the main body case 20 by removing the attachment hooks 41a, 41b from the hook insertion openings 33a, 33b, respectively.

The battery pack 5 attached to the main body case 20 with the attachment hooks 41a, 41b inserted into the hook insertion openings 33a, 33b are kept inserted in the main body case 20 when the engaging recesses 42a, 42b formed in the attachment hooks 41a, 41b engage with the lock levers 24A, 24B, respectively. In the state where the battery pack 5 is attached to the main body case 20, a connector 43 of the battery pack 5 is electrically connected to a connector 26 of the main body unit 2 so that electric power from the battery pack 5 is supplied to the main body unit 2 (and hence the optical disc reproduction apparatus 1) through the connectors 43, 26.

Figure 3A:
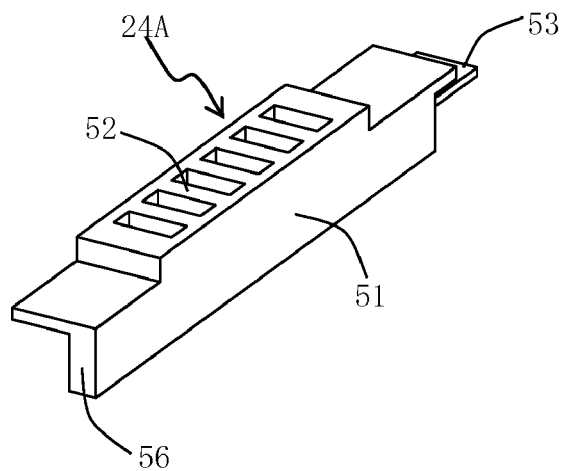
FIG. 3A is a schematic perspective view of a lock lever of the optical disc reproduction apparatus.
Figure 3B:
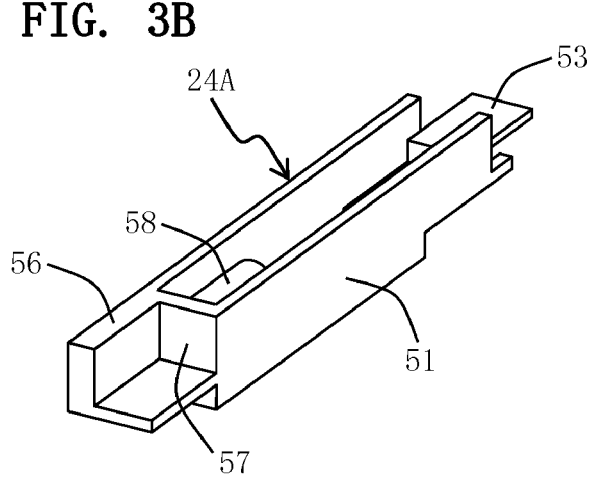
Figure 3C:
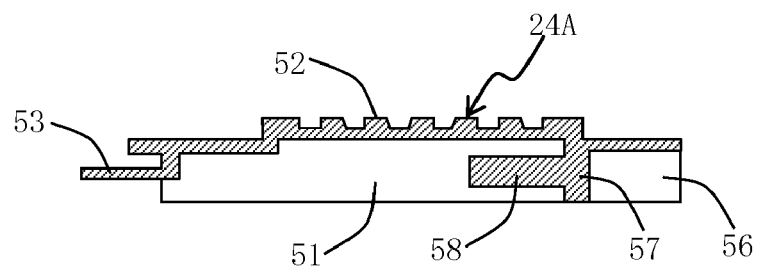
FIG. 3C is a schematic cross-sectional view of the lock lever of FIG. 3A.

Hereinafter, the structure and operation of the lock lever 24A (one of the lock levers 24A, 24B of the optical disc reproduction apparatus 1) will be described with reference to FIGS. 3A to 7B. FIGS. 3A to 3C show the structure of the lock lever 24A, in which FIG. 3A is a schematic perspective view of the lock lever 24A, and FIG. 3B is a schematic perspective view of the lock lever 24A as viewed at a different angle from FIG. 3A, while FIG. 3C is a schematic cross-sectional view of the lock lever 24A of FIG. 3A. As shown in FIGS. 3A to 3C, the lock lever 24A comprises a lever body 51, an operation button portion 52 and a tongue portion 53. The lever body 51 comprises an engaging portion 56, a restricting portion 57 and a spring holding portion 58. The engaging portion 56 serves to engage with the engaging recess 42a formed in the attachment hook 41a of the battery pack 5. The restricting portion 57 serves to restrict the movement of the lock lever 24A in the first direction. The spring holding portion 58 serves to hold the spring 25.

The operation button portion 52 is operated to move the lock lever 24A, and protrudes from the lever body 51 in the direction perpendicular to both the length and width directions of the lever body 51. The operation button portion 52 has a width equal to that of the lever body 51. The tongue portion 53 serves to restrict the movement of the lock lever 24A in the first direction, and extends from the lever body 51 in a length direction of the lever body 51. The tongue portion 53 is formed to be thin and elastic in the direction perpendicular to both the length and width directions of the lever body 51. The tongue portion 53 has a width smaller than that of the lever body 51.

Figure 4:
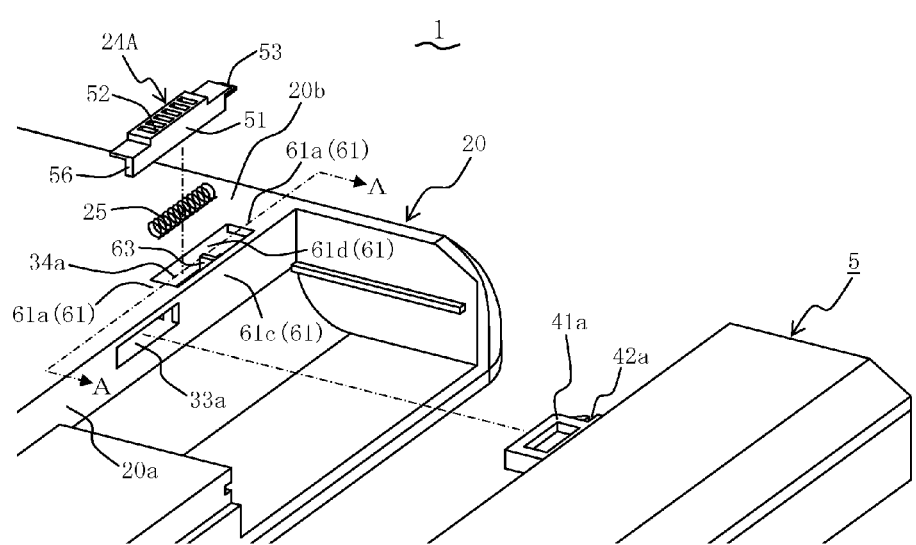
FIG. 4 is an enlarged, partially exploded, perspective view of a portion of the optical disc reproduction apparatus shown in FIG. 2B, showing how the lock lever is assembled to the optical disc reproduction apparatus.
Figure 5A:
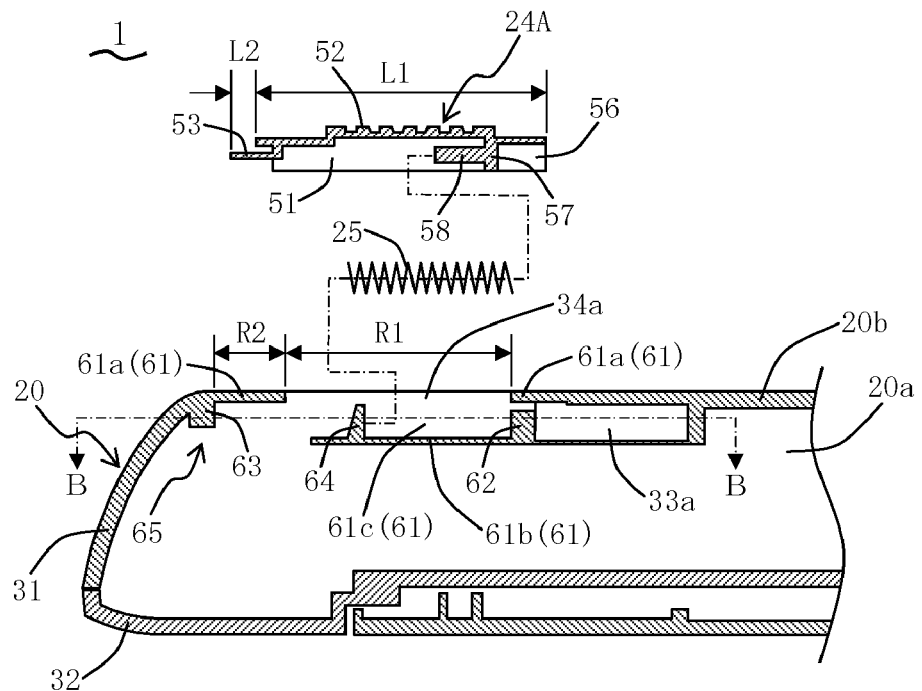
Figure 5B:
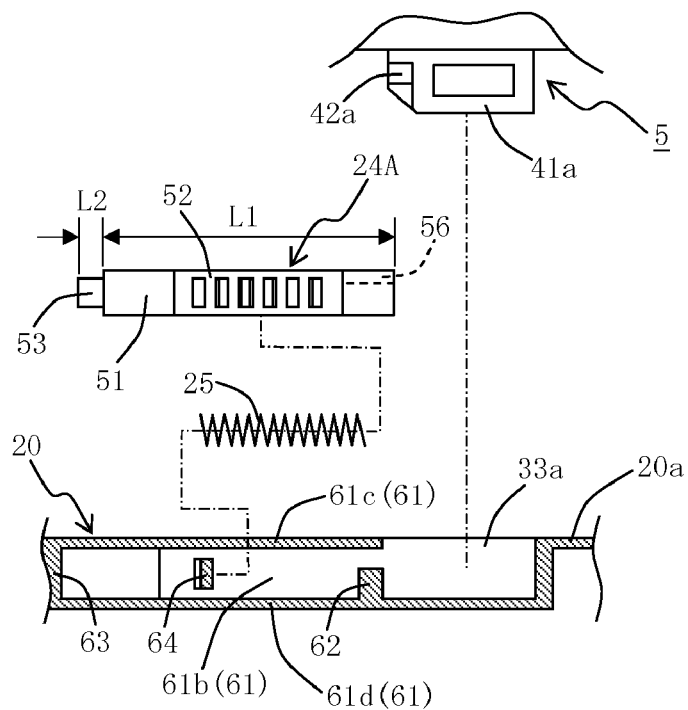
FIG. 5B is a partially exploded cross-sectional view along line B-B of FIG. 5A.

FIGS. 4, 5A and 5B show how the lock lever 24A is assembled to the optical disc reproduction apparatus 1, in which FIG. 4 is an enlarged, partially exploded, perspective view of a portion of the optical disc reproduction apparatus 1 shown in FIG. 2B, and FIG. 5A is a partially exploded cross-sectional view along line A-A of FIG. 4, while FIG. 5B is a partially exploded cross-sectional view along line B-B of FIG. 5A. In addition to the above structure, the main body case 20 comprises a lever support body 61 (61a, 61b, 61c, 61d), a first restricting member 62, a second restricting member 63 and a spring retaining member 64 as shown in FIGS. 4, 5A and 5B to assemble the lock lever 24A to the optical disc reproduction apparatus 1. The lever support body 61 serves to movably support the lock lever 24A, and comprises: an opening-side support body part 61a provided on a periphery of the operation opening 34a of the bottom wall 20b of the main body case 20; an opposite support body part 61b provided in a position opposite to the operation opening 34a; and side support body parts 61c, 61d contiguous to the opening-side support body part 61a and the opposite support body part 61b.

The opening-side support body part 61a is a part of the bottom wall 20b of the main body case 20. The opposite support body part 61b projects inside the main body case 20 from the rear wall 20a. The side support body part 61c is a part of the rear wall 20a of the main body case 20. Further, the side support body part 61d projects inside the main body case 20 from the bottom wall 20b of the main body case 20. A space surrounded by the opening-side support body part 61a, the opposite support body part 61b and the side support body parts 61c, 61d is contiguous to the operation opening 34a. The distance between the side support body part 61c and the side support body part 61d is equal to the width of the operation opening 34a.

The first restricting member 62 restricts the movement of the lock lever 24A in the first direction by contact of the restricting portion 57 of the lock lever 24A with the first restricting member 62. The first restricting member 62 projects from the opposite support body part 61b and the side support body part 61d toward the opening-side support body part 61a (toward the bottom wall 20b of the main body case 20) and the side support body part 61c (toward the rear wall 20a of the main body case 20). On the other hand, the second restricting member 63 restricts the movement of the lock lever 24A in the second direction by contact of an end of the tongue portion 53 of the lock lever 24A with the second restricting member 63. The second restricting member 63 projects inside the main body case 20 from the bottom wall 20b of the main body case 20. The spring retaining member 64 serves to retain the spring 25, and projects from the opposite support body part 61b toward the opening-side support body part 61a. The width of the lever body 51 is slightly smaller than that of the operation opening 34a (or the distance between the side support body parts 61c and 61d). Further, the distance from the end of the tongue portion 53 to an outer surface (surface opposite to the tongue portion 53) of the restricting portion 57 is smaller than the distance between the first restricting member 62 and the second restricting member 63.

Figure 6A:
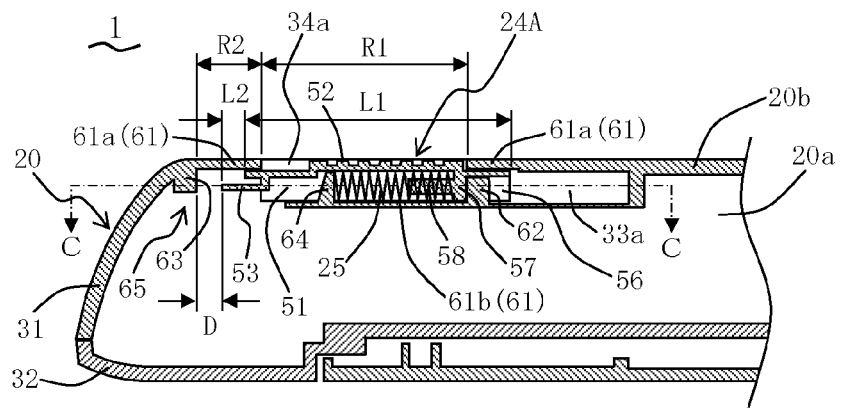
Figure 6B:
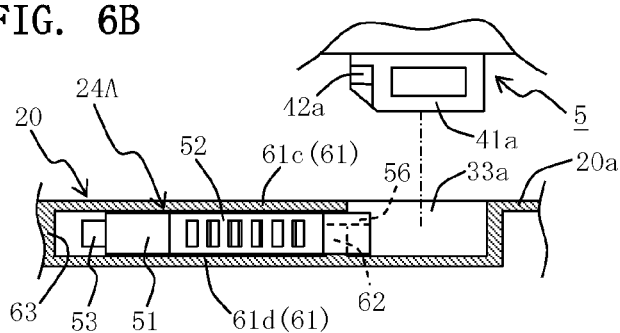
FIG. 6B is a schematic cross-sectional view along line C-C of FIG. 6A.

FIG. 6A is a schematic cross-sectional view showing a state where the lock lever 24A has been assembled to the optical disc reproduction apparatus 1, and corresponding to the A-A cross-sectional view of FIG. 4 when the movement of the lock lever 24A in the first direction is restricted, while FIG. 6B is a schematic cross-sectional view along line C-C of FIG. 6A. On the other hand, FIG. 7A is a schematic cross-sectional view showing a state where the lock lever 24A has been assembled to the optical disc reproduction apparatus 1, and corresponding to the A-A cross-sectional view of FIG. 4 when the movement of the lock lever 24A in the second direction is restricted, while FIG. 7B is a schematic cross-sectional view along line D-D of FIG. 7A.

As shown in FIGS. 6A, 6B, 7A and 7B, the lock lever 24A is assembled to the main body case 20 by being placed in the space surrounded by the opening-side support body part 61a, the opposite support body part 61b and the side support body parts 61c, 61d, so as to allow the operation button portion 52 to be exposed to or face the operation opening 34a of the main body case 20, in such a posture that the tongue portion 53 is positioned on the side of the second restricting member 63, while the direction perpendicular to both the length and width directions of the lever body 51 coincides with the direction perpendicular to an opening surface of the operation opening 34a. It will be described later how the lock lever 24A is assembled to the main body case 20.

In the state where the lock lever 24A is thus assembled to the main body case 20, the lever support body 61 (opening-side support body part 61a, opposite support body part 61b and side support body parts 61c, 61d) serves as a guide by which the lock lever 24A is supported so as to be reciprocally movable in the first direction (direction of arrow U1 in FIG. 2A) and the second direction (direction of arrow U2 in FIG. 2A) opposite to the first direction. Further, the lock lever 24A is supported so as to be movable in the length direction of the lever body 51. More specifically, the lock lever 24A is supported so as to be reciprocally movable between the operation opening 34a and the opposite support body part 61b such that the length direction of the lever body 51 coincides with the first and second directions, and that the direction perpendicular to both the length and width directions of the lever body 51 coincides with the direction perpendicular to the opening surface of the operation opening 34a.

Figure 7A:
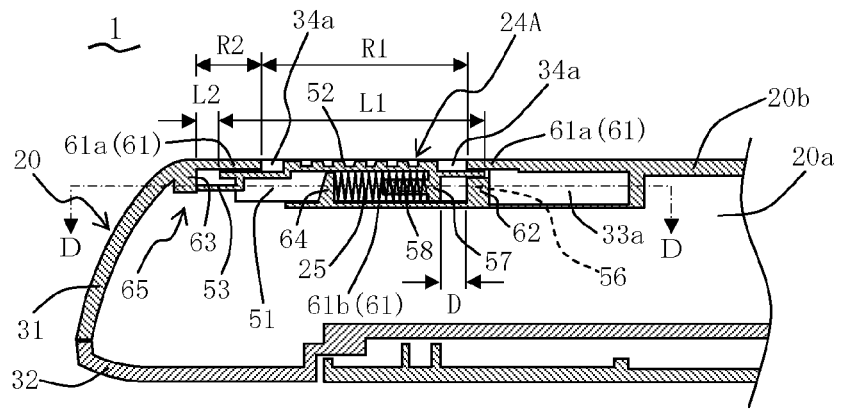
Figure 7B:
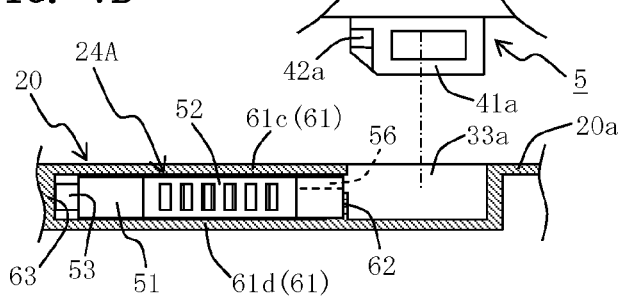
FIG. 7B is a schematic cross-sectional view along line D-D of FIG. 7A.

The lock lever 24A thus assembled to the main body case 20 is restricted from moving in the first direction by contact of the restricting portion 57 of the lever body 51 with the first restricting member 62 (refer to FIGS. 6A, 6B), and further restricted from moving in the second direction by contact of the end of the tongue portion 53 with the second restricting member 63 (refer to FIGS. 7A, 7B). In other words, the lock lever 24A is supported so as to be reciprocally movable in a range restricted by the first and second restricting members 62, 63, more specifically between a first position where the restricting portion 57 contacts the first restricting member 62 and a second position where the end of the tongue portion 53 contacts the second restricting member 63.

In short, the lock lever 24A assembled to the main body case 20 is supported by the lever support body 61 so as to be reciprocally movable in the first and second directions in a range restricted by the first and second restricting members 62, 63, and so as to allow the operation button portion 52 (which is a part of the lock lever 24A) to be exposed to or face the operation opening 34a. The lock lever 24A thus assembled to the main body case 20 is moved by operating the operation button portion 52 from outside the main body case 20. When the lock lever 24A is in the first position (where the restricting portion 57 contacts the first restricting member 62, and where the movement of the lock lever 24A in the first direction is restricted by the first restricting member 62), the engaging portion 56 of the lever body 51 is exposed to or faces the hook insertion opening 33a of the main body case 20 (refer to FIGS. 6A, 6B). On the other hand, when the lock lever 24A is in the second position (where the end of the tongue portion 53 contacts the second restricting member 63, and where the movement of the lock lever 24A in the second direction is restricted by the second restricting member 63), the engaging portion 56 of the lever body 51 is not exposed to the hook insertion opening 33a of the main body case 20 (refer to FIGS. 7A, 7B).

Thus, if the lock lever 24A is in the first position when the attachment hook 41a of the battery pack 5 is inserted into the hook insertion opening 33a of the main body case 20 (or when the battery pack 5 is attached to the main body case 20), the engaging portion 56 of the lock lever 24A engages with the engaging recess 42a of the attachment hook 41a of the battery pack 5 to allow the battery pack 5 to be kept attached to the main body case 20. On the other hand, if the lock lever 24A is in the second position when the attachment hook 41a of the battery pack 5 is inserted into the hook insertion opening 33a of the main body case 20, the engagement of the engaging portion 56 of the lock lever 24A with the engaging recess 42a of the attachment hook 41a of the battery pack 5 is released to release the battery pack 5 from attachment to the main body case 20.

Further, the spring 25 is interposed between the lock lever 24A and the main body case 20, and more specifically between the restricting portion 57 of the lever body 51 and the spring retaining member 64 of the main body case 20. The spring 25 is held by the spring holding portion 58 of the lever body 51, and is interposed and compressed between the restricting portion 57 of the lever body 51 and the spring retaining member 64 of the main body case 20 so as to bias the lock lever 24A in the first direction. Thus, when the operation button portion 52 is not operated, the lock lever 24A is biased by the spring 25 so as to be held in the first position where the restricting portion 57 contacts the first restricting member 62 (i.e. where the battery pack 5 is kept attached to the main body case 20). Then, when the operation button portion 52 is pushed in the second direction, the lock lever 24A is moved against the bias of the spring 25 to the second position where the end of the tongue portion 53 contacts the second restricting member 63 (i.e. where the battery pack 5 is not kept attached to the main body case 20).

In the optical disc reproduction apparatus 1 of the present embodiment, assuming that L1 is length of the lever body 51, L2 is length from the end of the tongue portion 53 to an end of the lever body 51, R1 is length of the operation opening 34a, R2 is length from the second restricting member 63 to the operation opening 34a, and D is movable distance of the lock lever 24A (or moving distance from the first position where the restricting portion 57 contacts the first restricting member 62 to the second position where the end of the tongue portion 53 contacts the second restricting member 63), the length L1 of the lever body 51 is designed to satisfy the relation:

$$L1 > R1 + R2 - L2$$

while the length L2 from the end of the tongue portion 53 to the end of the lever body 51 is designed to satisfy the relation:

$$L2 < R2 - D$$

Based on the relation $L2 < R2 - D$ ($D + L2 < R2$), it is apparent from FIG. 6A that when the lock lever 24A is in the first position (where the restricting portion 57 contacts the first restricting member 62), the end of the lever body 51 on the side of the second restricting member 63 is located in a position overlapping the opening-side support body part 61a, and is not exposed to the operation opening 34a. Further, based on the relation $L1 > R1 + R2 - L2$ ($L2 + L1 > R2 + R1$), it is apparent from FIG. 7A that when the lock lever 24A is in the second position (where the end of the tongue portion 53 contacts the second restricting member 63), the end of the lever body 51 on the side of the first restricting member 62 is located in a position overlapping the opening-side support body part 61a, and is not exposed to the operation opening 34a. In other words, if the relations $L2 < R2 - D$ and $L1 > R1 + R2 - L2$ are satisfied, neither the end of the lever body 51 on the side of the first restricting member 62 nor the end of the lever body 51 on the side of the second restricting member 63 is exposed to or faces the operation opening 34a in any position of the lock lever 24. Thus, the lock lever 24A is prevented from falling off out of the main body case 20 through the operation opening 34a (from the space surrounded by the opening-side support body part 61a, the opposite support body part 61b and the side support body parts 61c, 61d).

Note that the main body case 20 comprises a tongue portion escape section 65 for temporarily escaping the tongue portion 53 when attaching the lock lever 24A to the main body case 20. The tongue portion escape section 65 is a space around an end of the second restricting member 63, and is connected to the operation opening 34a through a gap between the second restricting member 63 and the opposite support body part 61b. Also note that the opposite support body part 61b is provided such that at least a part of the opposite support body part 61b overlaps the operation button portion 52 in the direction perpendicular to the opening surface of the operation opening 34a when the lock lever 24A is in the second position (where the movement of the lock lever 24A in the second direction is restricted by the second restricting member 63). This is in order to prevent the lock lever 24A from falling to the tongue portion escape section 65 through the gap between the second restricting member 63 and the opposite support body part 61b even if the operation button portion 52 is pushed from outside the main body case 20 when the lock lever 24A is in or near the second position.

Hereinafter, a method of assembling the lock lever 24A to the main body case 20 will be described with reference to FIGS. 8A to 8D, which are each a schematic cross-sectional view corresponding to the A-A cross-sectional view of FIG. 4, showing how to assemble the lock lever 24A to the main body case 20. First, one end of the spring 25 is attached to the spring holding portion 58 of the lock lever 24A, and the tongue portion 53 of the lock lever 24A is inserted into the main body case 20 through the operation opening 34a. Then, the tongue portion 53 of the lock lever 24A is allowed to temporarily escape to the tongue portion escape section 65 (i.e. allowed to enter the space around the end of the second restricting member 63 through the gap between the second restricting member 63 and the opposite support body part 61b) while the other end of the spring 25 is pressed against the spring retaining member 64 of the main body case 20 (refer to FIG. 8A). At this time, the spring 25 is in a state of being compressed between the restricting portion 57 of the lever body 51 and the spring retaining member 64 of the main body case 20.

Figure 8A:
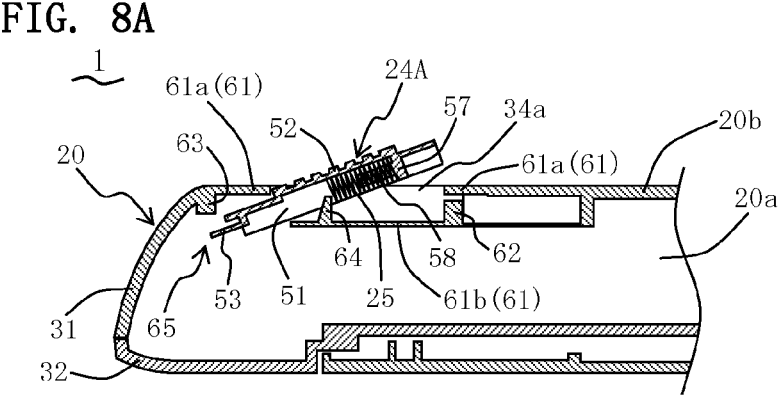
FIGS. 8A to 8D are each a schematic cross-sectional view corresponding to the A-A cross-sectional view of FIG. 4, showing how to assemble the lock lever to the main body case.
Figure 8B:
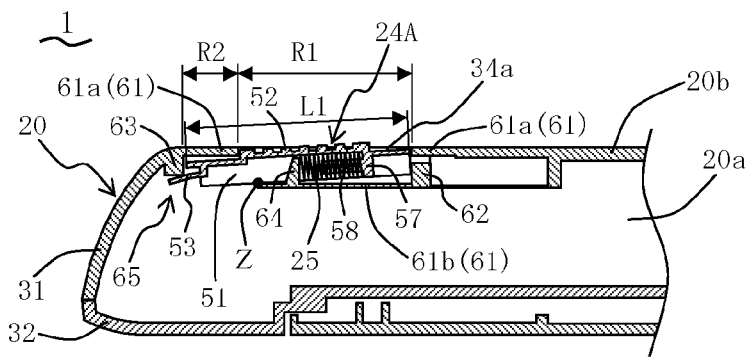

Subsequently, an end of the lock lever 24A opposite to the tongue portion 53 is pushed toward the opposite support body part 61b so as to house the entire lever body 51 of the lock lever 24A in the main body case 20 (more specifically in the space surrounded by the opening-side support body part 61a, the opposite support body part 61b and the side support body parts 61c, 61d of the lever support body 61) through the operation opening 34a (refer to FIG. 8B). At this time, the end of the lock lever 24A opposite to the tongue portion 53 is pushed toward the opposite support body part 61b while the lever body 51 of the lock lever 24A contacts the end of the opposite support body part 61b, and while the tongue portion 53 contacts the end of the second restricting member 63. More specifically, a contact point Z between the lock lever 24A and the opposite support body part 61b serves as a fulcrum to push the end of the lock lever 24A opposite to the tongue portion 53 toward the opposite support body part 61b, and to allow the tongue portion 53 to push the end of the second restricting member 63 toward the opening-side support body part 61a (toward the bottom wall 20b of the main body case 20).

Thus, the process of housing the entire lever body 51 in the main body case 20 is carried out as the tongue portion 53 deforms elastically. Further, the spring 25 is in the state of being compressed between the restricting portion 57 of the lever body 51 and the spring retaining member 64 of the main body case 20. Note that the length L1 of the lever body 51 is designed to satisfy the relation L1<R1+R2 (where R1 is length of the operation opening 34a, and R2 is length from the second restricting member 63 to the operation opening 34a) so as to make it possible to house the entire lever body 51 in the main body case 20 through the operation opening 34a of the main body case 20.

Figure 8C:
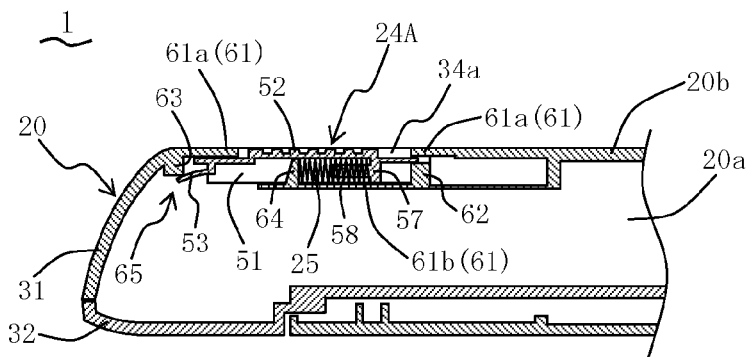
Figure 8D:
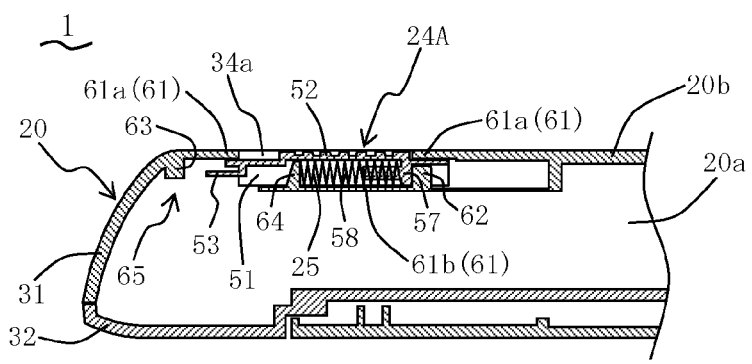

After the entire lever body 51 is inserted into the main body case 20, the lock lever 24A is moved in the first direction (toward the first restricting member 62) so as to allow the end of the lever body 51 opposite to the tongue portion 53 (the end of the lever body 51 on the side of the first restricting member 62) to overlap the opening-side support body part 61a (refer to FIG. 8C). At this time, the spring 25 is in the state of being compressed between the restricting portion 57 of the lever body 51 and the spring retaining member 64 of the main body case 20. Then, the lock lever 24A is further moved in the first direction to allow the tongue portion 53 to come off the end of the second restricting member 63 (i.e. brought to a state where the tongue portion 53 does not escape to the tongue portion escape section 65) (refer to FIG. 8D). When the tongue portion 53 comes off the end of the second restricting member 63, the tongue portion 53 restores its original shape (extending from the lever body 51 in the length direction of the lever body 51) due to its elasticity. At this time, the spring 25 is in the state of being compressed between the restricting portion 57 of the lever body 51 and the spring retaining member 64 of the main body case 20.

Thus, the lock lever 24A is brought to a state where it is assembled to the main body case 20. More specifically, the lock lever 24A is brought to a state where the operation button portion 52 of the lock lever 24A is exposed to or faces the operation opening 34a, and where the lock lever 24A is supported by the lever support body 61 so as to be reciprocally movable in a range restricted by the first and second restricting members 62, 63 (between the first position where the restricting portion 57 contacts the first restricting member 62 and the second position where the end of the tongue portion 53 contacts the second restricting member 63). Further, the spring 25 is brought to a state of being interposed and compressed between the restricting portion 57 of the lever body 51 and the spring retaining member 64 of the main body case 20 so as to bias the lock lever 24A in the first direction (toward the first restricting member 62). The lock lever 24A is thus assembled to the main body case 20.

Figure 9A:
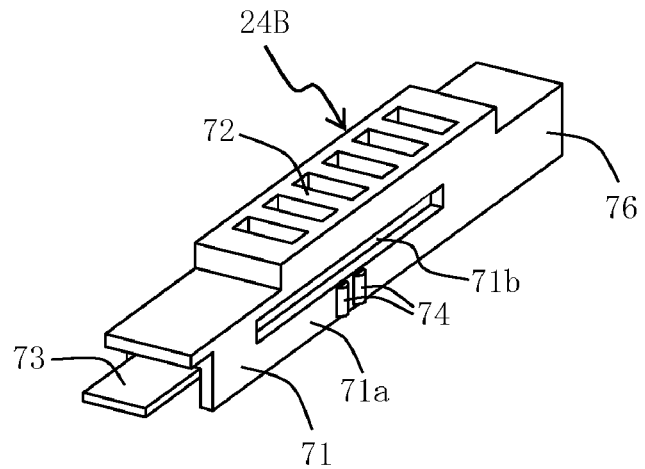
FIG. 9A is a schematic perspective view of another lock lever of the optical disc reproduction apparatus.
Figure 9B:
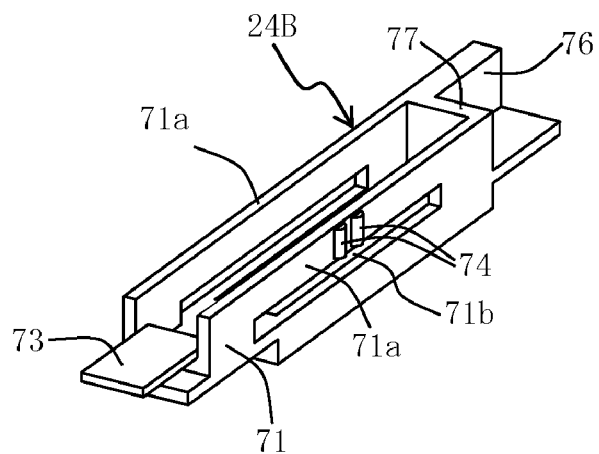
Figure 9C:
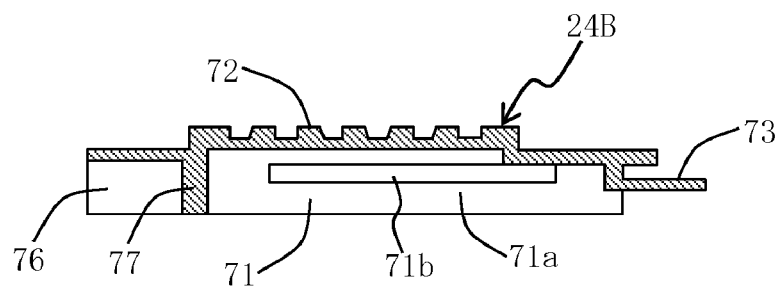
FIG. 9C is a schematic cross-sectional view of the lock lever of FIG. 9A.

Hereinafter, the structure and operation of the lock lever 24B (the other of the lock levers 24A, 24B of the optical disc reproduction apparatus 1) will be described with reference to FIGS. 9A to 13B. FIGS. 9A to 9C show the structure of the lock lever 24B, in which FIG. 9A is a schematic perspective view of the lock lever 24B, and FIG. 9B is a schematic perspective view of the lock lever 24B as viewed at a different angle from FIG. 9A, while FIG. 9C is a schematic cross-sectional view of the lock lever 24B of FIG. 9A. As shown in FIGS. 9A to 9C, the lock lever 24B comprises a lever body 71, an operation button portion 72, a tongue portion 73 and projecting portions 74. The lever body 71 has an engaging portion 76 and a restricting portion 77. The engaging portion 76 serves to engage with the engaging recess 42b formed in the attachment hook 41b of the battery pack 5. The restricting portion 77 serves to restrict the movement of the lock lever 24B in the first direction.

The operation button portion 72 is operated to move the lock lever 24B, and protrudes from the lever body 71 in the direction perpendicular to both the length and width directions of the lever body 71. The operation button portion 72 has a width equal to that of the lever body 71. The tongue portion 73 serves to restrict the movement of the lock lever 24B in the first direction, and extends from the lever body 71 in a length direction of the lever body 71. The tongue portion 73 is formed to be thin and elastic in the direction perpendicular to both the length and width directions of the lever body 71. The tongue portion 73 has a width smaller than that of the lever body 71. The projecting portions 74 serve to hold the position of the lock lever 24B. The projecting portions 74 are provided on side walls 71a of the lever body 71, and project from the lever body 71 in the width direction of the lever body 71. Each of the side walls 71a of the lever body 71 has an elongated slot 71b formed therein so as to have elasticity in the width direction of the lever body 71.

Figure 10:
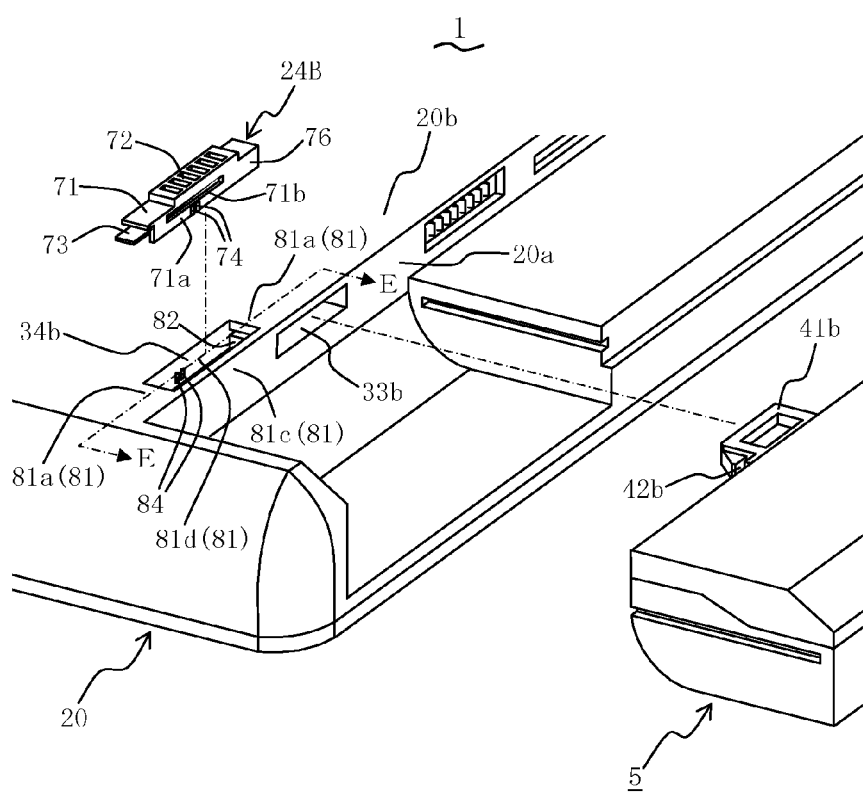
FIG. 10 is an enlarged, partially exploded, perspective view of a portion of the optical disc reproduction apparatus shown in FIG. 2B, showing how the lock lever is assembled to the optical disc reproduction apparatus.
Figure 11A:
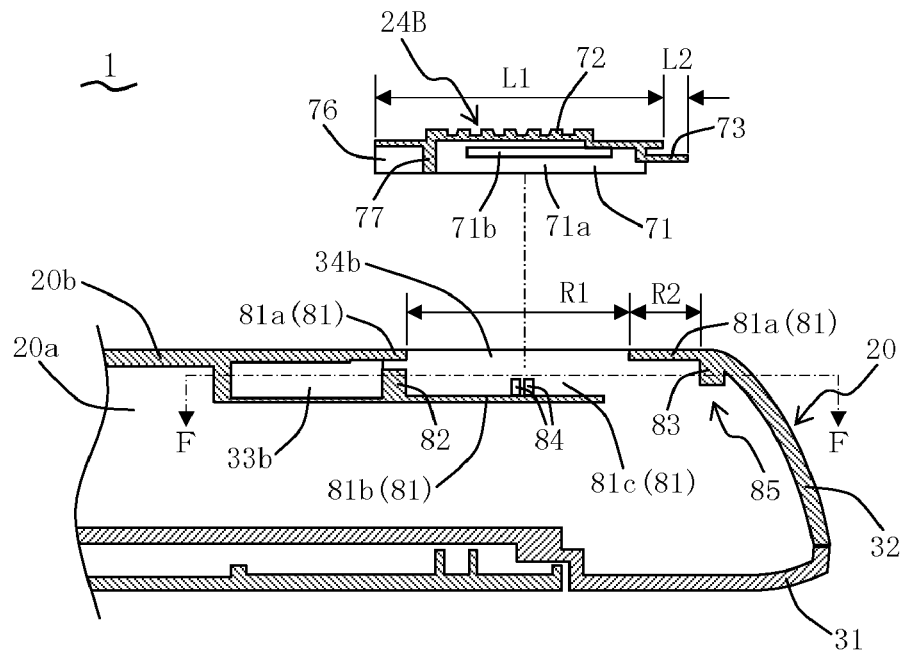
Figure 11B:
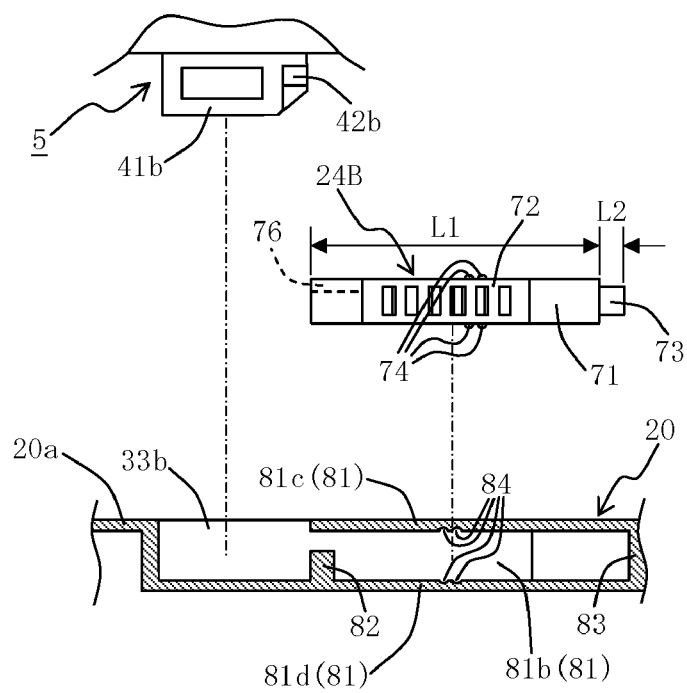
FIG. 11B is a partially exploded cross-sectional view along line F-F of FIG. 11A.

FIGS. 10, 11A and 11B show how the lock lever 24B is assembled to the optical disc reproduction apparatus 1, in which FIG. 10 is an enlarged, partially exploded, perspective view of a portion of the optical disc reproduction apparatus 1 shown in FIG. 2B, and FIG. 11A is a partially exploded cross-sectional view along line E-E of FIG. 10, while FIG. 11B is a partially exploded cross-sectional view along line F-F of FIG. 11A. In addition to the above structure, the main body case 20 comprises a lever support body 81 (81a, 81b, 81c, 81d), a first restricting member 82, a second restricting member 83 and recessed portions 84 as shown in FIGS. 10, 11A and 11B to assemble the lock lever 24B to the optical disc reproduction apparatus 1. The lever support body 81 serves to movably support the lock lever 24B, and comprises: an opening-side support body part 81a provided on a periphery of the operation opening 34b of the bottom wall 20b of the main body case 20; an opposite support body part 81b provided in a position opposite to the operation opening 34b; and side support body parts 81c, 81d contiguous to the opening-side support body part 81a and the opposite support body part 81b.

The opening-side support body part 81a is a part of the bottom wall 20b of the main body case 20. The opposite support body part 81b projects inside the main body case 20 from the rear wall 20a. The side support body part 81c is a part of the rear wall 20a of the main body case 20. The side support body part 81d projects inside the main body case 20 from the bottom wall 20b of the main body case 20. A space surrounded by the opening-side support body part 81a, the opposite support body part 81b and the side support body parts 81c, 81d is contiguous to the operation opening 34b. The distance between the side support body part 81c and the side support body part 81d is equal to the width of the operation opening 34b.

The first restricting member 82 restricts the movement of the lock lever 24B in the first direction by contact of the restricting portion 77 of the lock lever 24B with the first restricting member 82. The first restricting member 82 projects from the opposite support body part 81*b* and the side support body part 81*d* toward the opening-side support body part 81*a* (toward the bottom wall 20*b* of the main body case 20) and the side support body part 81*c* (toward the rear wall 20*a* of the main body case 20). On the other hand, the second restricting member 83 restricts the movement of the lock lever 24B in the second direction by contact of an end of the tongue portion 73 of the lock lever 24B with the second restricting member 83. The second restricting member 83 projects inside the main body case 20 from the bottom wall 20*b* of the main body case 20.

The recessed portions 84 are formed in the side support body parts 81*c*, 81*d* so as to engage with the projecting portions 74 of the lock lever 24B, respectively, and thereby hold the position of the lock lever 24B. In the present embodiment as shown in the drawings, four projecting portions 74 (two one each side wall 71*a*) and corresponding four recessed portions 84 (two in each of the side support body parts 81*c*, 81*d*) are provided. However, for the purpose of holding the position of the lock lever 24B, it is enough if one projecting portion 74 is provided on one or each side wall 71*a*, and one corresponding recessed portion 84 is provided in one or each of the side support body parts 81*c*, 81*d*, although the four projecting portions 74 and four recessed portions 84 as described above are more preferable. The width of the lever body 71 is slightly smaller than that of the operation opening 34*b* (or the distance between the side support body parts 81*c* and 81*d*). Further, the distance from the end of the tongue portion 73 to an outer surface (surface opposite to the tongue portion 73) of the restricting portion 77 is smaller than the distance between the first restricting member 82 and the second restricting member 83.

Figure 12A:
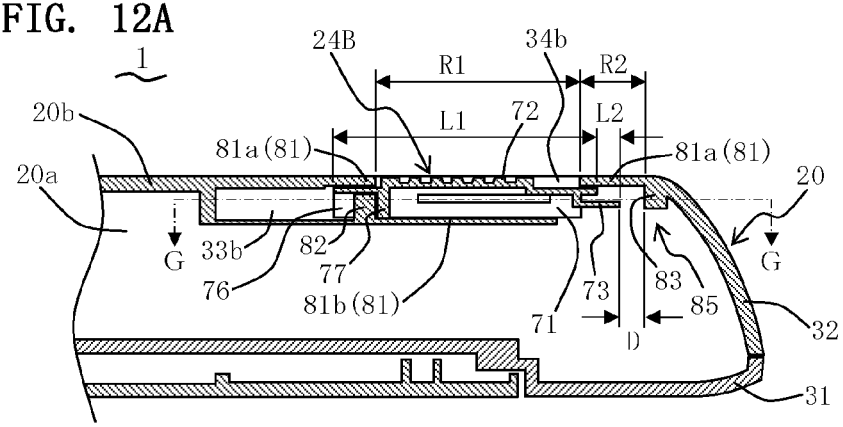
Figure 12B:
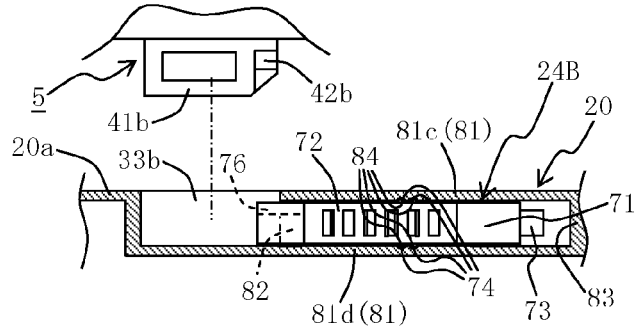
FIG. 12B is a schematic cross-sectional view along line G-G of FIG. 12A.

FIG. 12A is a schematic cross-sectional view showing a state where the lock lever 24B has been assembled to the optical disc reproduction apparatus 1, and corresponding to the E-E cross-sectional view of FIG. 10 when the movement of the lock lever 24B in the first direction is restricted, while FIG. 12B is a schematic cross-sectional view along line G-G of FIG. 12A. On the other hand, FIG. 13A is a schematic cross-sectional view showing a state where the lock lever 24B has been assembled to the optical disc reproduction apparatus 1, and corresponding to the E-E cross-sectional view of FIG. 10 when the movement of the lock lever 24B in the second direction is restricted, while FIG. 13B is a schematic cross-sectional view along line H-H of FIG. 13A.

As shown in FIGS. 12A, 12B, 13A and 13B, the lock lever 24B is assembled to the main body case 20 by being placed in the space surrounded by the opening-side support body part 81*a*, the opposite support body part 81*b* and the side support body parts 81*c*, 81*d*, so as to allow the operation button portion 72 to be exposed to or face the operation opening 34*b* of the main body case 20, in such a posture that the tongue portion 73 is positioned on the side of the second restricting member 83, while the direction perpendicular to both the length and width directions of the lever body 71 coincides with the direction perpendicular to an opening surface of the operation opening 34*b*. It will be described later how the lock lever 24B is assembled to the main body case 20.

In the state where the lock lever 24B is thus assembled to the main body case 20, the lever support body 81 (opening-side support body part 81*a*, opposite support body part 81*b* and side support body parts 81*c*, 81*d*) serves as a guide by which the lock lever 24B is supported so as to be reciprocally movable in the first direction (direction of arrow V1 in FIG. 2A) and the second direction (direction of arrow V2 in FIG. 2A) opposite to the first direction. Further, the lock lever 24B is supported so as to be movable in the length direction of the lever body 71. More specifically, the lock lever 24B is supported so as to be reciprocally movable between the operation opening 34*b* and the opposite support body part 81*b* such that the length direction of the lever body 71 coincides with the first and second directions, and that the direction perpendicular to both the length and width directions of the lever body 71 coincides with the direction perpendicular to the opening surface of the operation opening 34*b*.

Figure 13A:
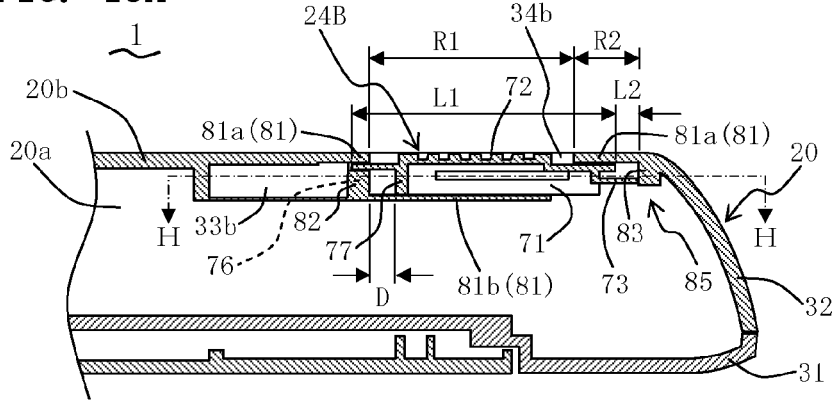
Figure 13B:
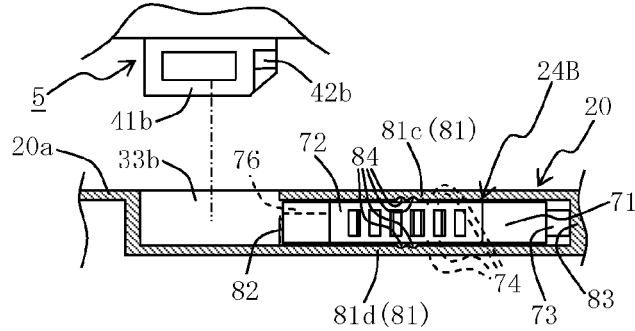
FIG. 13B is a schematic cross-sectional view along line H-H of FIG. 13A.

The lock lever 24B thus assembled to the main body case 20 is restricted from moving in the first direction by contact of the restricting portion 77 of the lever body 71 with the first restricting member 82 (refer to FIGS. 12A, 12B), and further restricted from moving in the second direction by contact of the end of the tongue portion 73 with the second restricting member 83 (refer to FIGS. 13A, 13B). In other words, the lock lever 24B is supported so as to be reciprocally movable in a range restricted by the first and second restricting members 82, 83, more specifically between a first position where the restricting portion 77 contacts the first restricting member 82 and a second position where the end of the tongue portion 73 contacts the second restricting member 83.

In short, the lock lever 24B assembled to the main body case 20 is supported by the lever support body 81 in a range restricted by the first and second restricting members 82, 83 so as to be reciprocally movable in the first and second directions, and so as to allow the operation button portion 72 (which is a part of the lock lever 24B) to be exposed to or face the operation opening 34*b*. The lock lever 24B thus assembled to the main body case 20 is moved by operating the operation button portion 72 from outside the main body case 20. When the lock lever 24B is in the first position (where the restricting portion 77 contacts the first restricting member 82, and where the movement of the lock lever 24B in the first direction is restricted by the first restricting member 82), the engaging portion 76 of the lever body 71 is exposed to or faces the hook insertion opening 33*b* of the main body case 20 (refer to FIGS. 12A, 12B). On the other hand, when the lock lever 24B is in the second position (where the end of the tongue portion 73 contacts the second restricting member 83, and where the movement of the lock lever 24B in the second direction is restricted by the second restricting member 83), the engaging portion 76 of the lever body 71 is not exposed to the hook insertion opening 33*b* of the main body case 20 (refer to FIGS. 13A, 13B).

Thus, if the lock lever 24B is in the first position when the attachment hook 41*b* of the battery pack 5 is inserted into the hook insertion opening 33*b* of the main body case 20 (or when the battery pack 5 is attached to the main body case 20), the engaging portion 76 of the lock lever 24B engages with the engaging recess 42*b* of the attachment hook 41*b* of the battery pack 5 to allow the battery pack 5 to be kept attached to the main body case 20. On the other hand, if the lock lever 24B is in the second position when the attachment hook 41*b* of the battery pack 5 is inserted into the hook insertion opening 33*b* of the main body case 20, the engagement of the engaging portion 76 of the lock lever 24B with the engaging recess 42*b* of the attachment hook 41*b* of the battery pack 5 is released to release the battery pack 5 from attachment to the main body case 20.

When the lock lever 24B is in the first position, the projecting portions 74 of the lever body 71 engage with the recessed portions 84 of the side support body parts 81*c*, 81*d*, respectively, so as to be held in the first position where the restricting portion 77 contacts the first restricting member 82 (i.e. where the battery pack 5 is kept attached to the main body case 20). Then, when the operation button portion 72 is pushed in the second direction, the engagement of the projecting portions 74 of the lever body 71 with the recessed portions 84 of the side support body parts 81c, 81d is released, and the lock lever 24B is moved to the second position where the end of the tongue portion 73 contacts the second restricting member 83 (i.e. where the battery pack 5 is not kept attached to the main body case 20).

In the optical disc reproduction apparatus 1 of the present embodiment, assuming that L1 is length of the lever body 71, L2 is length from the end of the tongue portion 73 to an end of the lever body 71, R1 is length of the operation opening 34b, R2 is length from the second restricting member 83 to the operation opening 34b, and D is movable distance of the lock lever 24B (or moving distance from the first position where the restricting portion 77 contacts the first restricting member 82 to the second position where the end of the tongue portion 73 contacts the second restricting member 83), the length L1 of the lever body 71 is designed to satisfy the relation:

$$L1 > R1 + R2 - L2$$

while the length L2 from the end of the tongue portion 73 to the end of the lever body 71 is designed to satisfy the relation:

$$L2 < R2 - D$$

Thus, similarly as in the structure described above to assemble the lock lever 24A to the main body case 20, neither the end of the lever body 71 on the side of the first restricting member 82 nor the end of the lever body 71 on the side of the second restricting member 83 is exposed to or faces the operation opening 34b in any position of the lock lever 24B. Thus, the lock lever 24B is prevented from falling off out of the main body case 20 through the operation opening 34b (from the space surrounded by the opening-side support body part 81a, the opposite support body part 81b and the side support body parts 81c, 81d) in the optical disc reproduction apparatus 1.

Note that the main body case 20 comprises a tongue portion escape section 85 for temporarily escaping the tongue portion 73 when attaching the lock lever 24B to the main body case 20. The tongue portion escape section 85 is a space around an end of the second restricting member 83, and is connected to the operation opening 34b through a gap between the second restricting member 83 and the opposite support body part 81b. Also note that the opposite support body part 81b is provided such that at least a part of the opposite support body part 81b overlaps the operation button portion 72 in the direction perpendicular to the opening surface of the operation opening 34b when the lock lever 24B is in the second position (where the movement of the lock lever 24B in the second direction is restricted by the second restricting member 83). This is for the purpose of preventing the lock lever 24B from falling to the tongue portion escape section 85 through the gap between the second restricting member 83 and the opposite support body part 81b even if the operation button portion 72 is pushed from outside the main body case 20 when the lock lever 24B is in or near the second position.

Hereinafter, a method of assembling the lock lever 24B to the main body case 20 will be described with reference to FIGS. 14A to 14D, which are each a schematic cross-sectional view corresponding to the E-E cross-sectional view of FIG. 10, showing how to assemble the lock lever 24B to the main body case 20. First, the tongue portion 73 of the lock lever 24B is inserted into the main body case 20 through the operation opening 34b. Then, the tongue portion 73 of the lock lever 24B is allowed to temporarily escape to the tongue portion escape section 85 (i.e. allowed to enter the space around the end of the second restricting member 83 through the gap between the second restricting member 83 and the opposite support body part 81b) (refer to FIG. 14A).

Figure 14A:
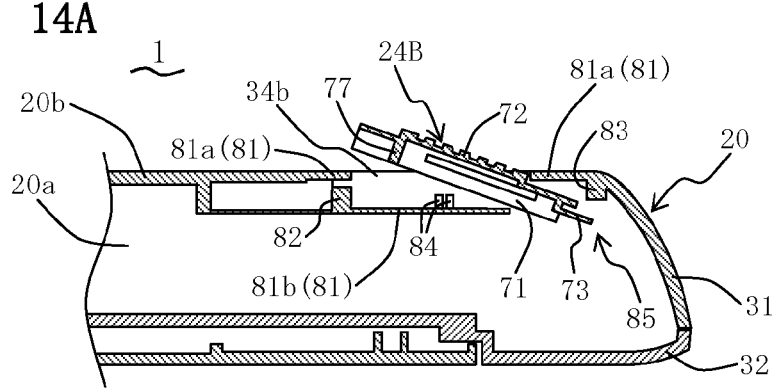
FIGS. 14A to 14D are each a schematic cross-sectional view corresponding to the E-E cross-sectional view of FIG. 10, showing how to assemble the lock lever to the main body case.
Figure 14B:
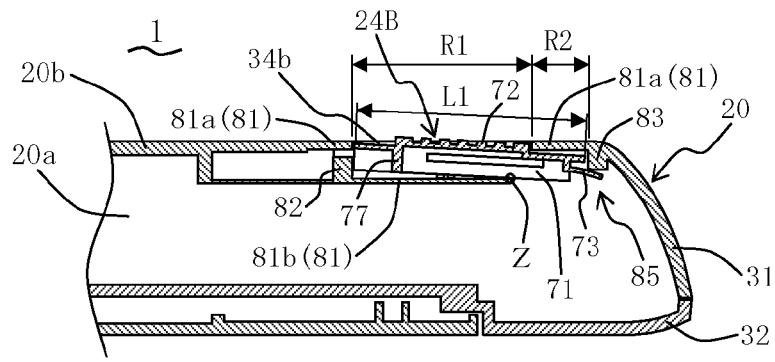

Subsequently, an end of the lock lever 24B opposite to the tongue portion 73 is pushed toward the opposite support body part 81b so as to house the entire lever body 71 of the lock lever 24B in the main body case 20 (more specifically in the space surrounded by the opening-side support body part 81a, the opposite support body part 81b and the side support body parts 81c, 81d of the lever support body) through the operation opening 34b (refer to FIG. 14B). At this time, the end of the lock lever 24B opposite to the tongue portion 73 is pushed toward the opposite support body part 81b while the lever body 71 of the lock lever 24B contacts the end of the opposite support body part 81b, and while the tongue portion 73 contacts the end of the second restricting member 83.

More specifically, a contact point Z between the lock lever 24B and the opposite support body part 81b serves as a fulcrum to push the end of the lock lever 24B opposite to the tongue portion 73 toward the opposite support body part 81b, and to allow the tongue portion 73 to push the end of the second restricting member 83 toward the opening-side support body part 81a (toward the bottom wall 20b of the main body case 20). Thus, the process of housing the entire lever body 71 in the main body case 20 is carried out as the tongue portion 73 deforms elastically. Note that the length L1 of the lever body 71 is designed to satisfy the relation L1<R1+R2 (where R1 is length of the operation opening 34b, and R2 is length from the second restricting member 83 to the operation opening 34b) so as to make it possible to house the entire lever body 71 in the main body case 20 through the operation opening 34b of the main body case 20.

Figure 14C:
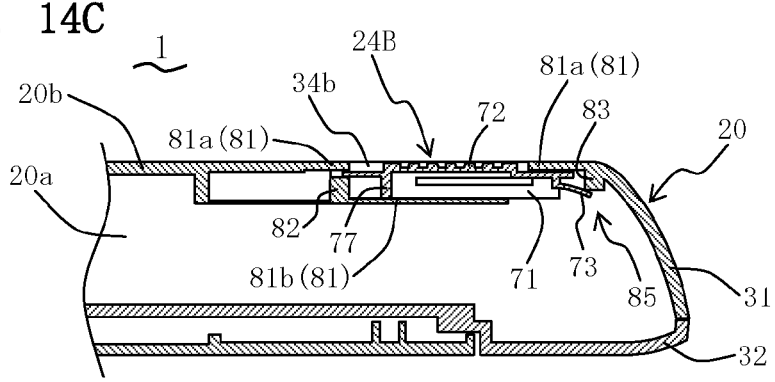
Figure 14D:
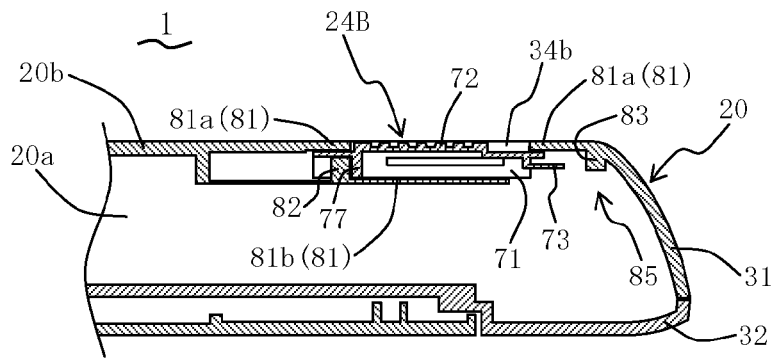

After the entire lever body 71 is inserted into the main body case 20, the lock lever 24B is moved in the first direction (toward the first restricting member 82) so as to allow the end of the lever body 71 opposite to the tongue portion 73 (the end of the lever body 71 on the side of the first restricting member 82) to overlap the opening-side support body part 81a (refer to FIG. 14C). Then, the lock lever 24B is further moved in the first direction to allow the tongue portion 73 to come off the end of the second restricting member 83 (i.e. brought to a state where the tongue portion 73 does not escape to the tongue portion escape section 85) (refer to FIG. 14D). Thus, the lock lever 24B is brought to a state where it is assembled to the main body case 20. More specifically, the lock lever 24B is brought to a state where the operation button portion 72 of the lock lever 24B is exposed to or faces the operation opening 34b, and where the lock lever 24B is supported by the lever support body 81 so as to be reciprocally movable in a range restricted by the first and second restricting members 82, 83 (between the first position where the restricting portion 77 contacts the first restricting member 82 and the second position where the end of the tongue portion 73 contacts the second restricting member 83). The lock lever 24B is thus assembled to the main body case 20.

According to the optical disc reproduction apparatus 1 of the present embodiment, the tongue portions 53, 73 of the lock levers 24A, 24B are inserted into the main body case 20 through the operation openings 34a, 34b, respectively, and are allowed to temporarily escape to the tongue portion escape sections 65, 85, respectively, so as to house the entire lever bodies 51, 71 in the main body case 20 through the operation openings 34a, 34b, respectively, making it possible to easily assemble the lock levers 24A, 24B to the main body case 20. In addition, even if the lock levers 24A, 24B assembled to the main body case 20 are in any position in the range in which the lock levers 24A, 24B can move (more specifically in the ranges restricted by the first restricting members 62, 82 and the second restricting members 63, 83, respectively), neither the ends of the lever bodies 51, 71 on the side of the first restricting members 62, 82 nor the ends of the lever bodies 51, 71 on the side of the second restricting members 63, 83 are exposed to or face the operation openings 34a, 34b, respectively, so that the lock levers 24A, 24B do not easily fall off out of the main body case 20.

It is to be noted that the present invention is not limited to the above embodiments, and various modifications are possible within the spirit and scope of the present invention. For example, the tongue portion of each the two lock levers can be designed to extend from an end of the lever body. The lock lever can be assembled to the main body case while the upper case and the lower case of the main body case are connected to each other, or while the upper case and the lower case are separate from each other. Although types of the two lock levers described above are different, they can be the same type. Further, although the two lock levers are used for a battery pack as a detachable member to be attached to and detached from the main body case, the lock levers can be used for other than a battery pack, for example, to keep a disc cover attached to the main body case (keep the disc cover closed), or can be used to keep another unit or element attached to the main body case. In addition, although two lock levers have been shown and described above, a single lock lever can be used therefor, and the use of at least one lock lever having an operation opening and provided to keep a unit or element attached to the main body case is assumed in the present invention. Furthermore, the present invention can be used not only for an optical disc reproduction apparatus, but for other electronic apparatus.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2010-179687 filed Aug. 10, 2010, the content of which is hereby incorporated by reference.

What is claimed is:

1. An electronic apparatus comprising: a case; a detachable member to be attached to and detached from the case; and a lock lever provided to keep the detachable member attached to the case, and provided in the case so as to be movable in a first direction and a second direction opposite to the first direction,
  wherein the case comprises: an operation opening to enable the lock lever to be operated from outside the case; a lever support body to movably support the lock lever; a first restricting member for restricting movement of the lock lever in the first direction; and a second restricting member for restricting movement of the lock lever in the second direction,
  wherein the lock lever is supported by the lever support body so as to be movable in the first and second directions in a range restricted by the first and second restricting members while a part of the lock lever is exposed to the operation opening,
  wherein the lever support body comprises an opposite support body part provided in a position opposite to the operation opening,
  wherein the lock lever comprises a lever body and a tongue portion extending from the lever body in a length direction of the lever body,
  wherein the lock lever is supported so as to be movable between the operation opening and the opposite support body part such that the length direction of the lever body coincides with the first and second directions, and that the direction perpendicular to both the length and width directions of the lever body coincides with the direction perpendicular to an opening surface of the operation opening,
  wherein the lock lever is restricted from moving in the second direction by contact of an end of the tongue portion with the second restricting member,
  wherein the lever body has a width smaller than that of the operation opening,
  wherein assuming that L1 is length of the lever body, L2 is length from the end of the tongue portion to an end of the lever body which is closer to the end of the tongue portion, R1 is length of the operation opening, R2 is length from the second restricting member to the operation opening, and D is movable distance of the lock lever, the length L1 of the lever body satisfies the relation:

$L1 > R1 + R2 - L2$ while the length L2 from the end of the tongue portion to the end of the lever body satisfies the relation:

$L2 < R2 - D$ wherein the case comprises a tongue portion escape section for temporarily escaping the tongue portion when attaching the lock lever to the case,
  wherein the tongue portion escape section is connected to the operation opening through a gap between the second restricting member and the opposite support body part, and
  wherein the tongue portion is elastic in the direction perpendicular to both the length and width directions of the lever body.

2. The electronic apparatus according to claim 1,
  wherein an elastic member is interposed between the lock lever and the case, and
  wherein the lock lever is biased by the elastic member so as to be held in a position where the detachable member is kept attached to the case.

3. The electronic apparatus according to claim 2,
  wherein the lock lever comprises a projecting portion to engage with a recessed portion formed in the lever support body, and is held in a position where the detachable member is kept attached to the case when the projecting portion engages with the recessed portion.

4. The electronic apparatus according to claim 3,
  wherein the lock lever further comprises an operation button portion, and is supported so as to allow the operation button portion to be exposed to the operation opening, and
  wherein the opposite support body part is provided such that at least a part of the opposite support body part overlaps the operation button portion when the lock lever is in a position where the movement of the lock lever in the second direction is restricted by the second restricting member.

5. The electronic apparatus according to claim 4,
  wherein the case houses an optical disc reading unit for reading recorded data from an optical disc, and
  wherein the detachable member is a battery pack for supplying electric power to the electronic apparatus.

6. The electronic apparatus according to claim 4,
wherein the case houses an optical disc reading unit for reading recorded data from an optical disc, and
wherein the detachable member is a disc cover for opening and closing a disc mounting unit to mount an optical disc.

7. The electronic apparatus according to claim 2,
wherein the lock lever further comprises an operation button portion, and is supported so as to allow the operation button portion to be exposed to the operation opening, and
wherein the opposite support body part is provided such that at least a part of the opposite support body part overlaps the operation button portion when the lock lever is in a position where the movement of the lock lever in the second direction is restricted by the second restricting member.

8. The electronic apparatus according to claim 1,
wherein the lock lever further comprises an operation button portion, and is supported so as to allow the operation button portion to be exposed to the operation opening, and
wherein the opposite support body part is provided such that at least a part of the opposite support body part overlaps the operation button portion when the lock lever is in a position where the movement of the lock lever in the second direction is restricted by the second restricting member.

9. The electronic apparatus according to claim 1,
wherein the lock lever comprises a projecting portion to engage with a recessed portion formed in the lever support body, and is held in a position where the detachable member is kept attached to the case when the projecting portion engages with the recessed portion.

10. The electronic apparatus according to claim 1,
wherein the case houses an optical disc reading unit for reading recorded data from an optical disc, and
wherein the detachable member is a battery pack for supplying electric power to the electronic apparatus.

11. The electronic apparatus according to claim 1,
wherein the case houses an optical disc reading unit for reading recorded data from an optical disc, and
wherein the detachable member is a disc cover for opening and closing a disc mounting unit to mount an optical disc.

\* \* \* \* \*